June 24, 1930. C. E. SHAW 1,767,318
METHOD AND APPARATUS FOR OPERATION OF FILTER PRESSES
Filed May 2, 1929 2 Sheets-Sheet 1
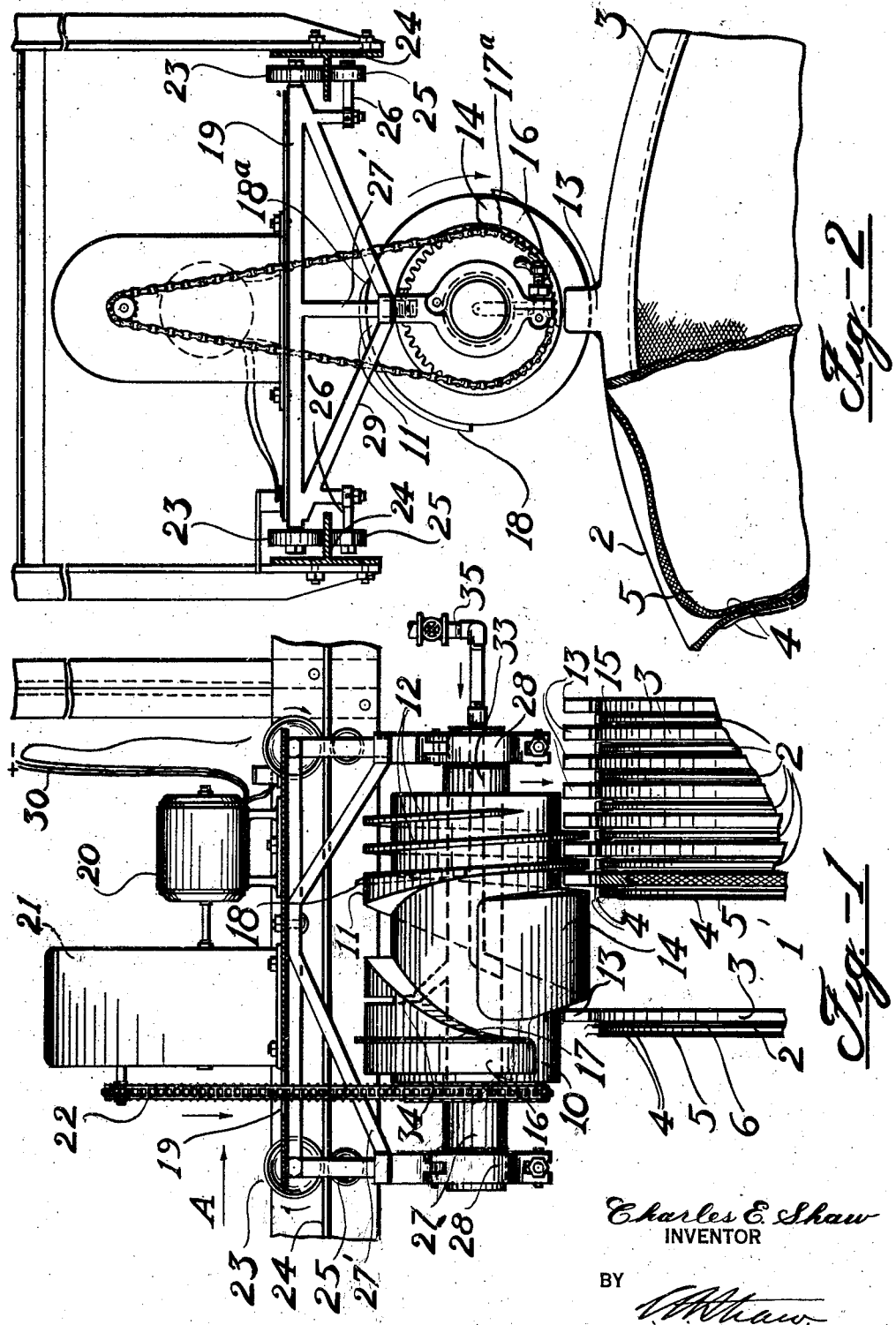
Charles E. Shaw
INVENTOR
BY
ATTORNEY June 24, 1930.  C. E. SHAW  1,767,318
METHOD AND APPARATUS FOR OPERATION OF FILTER PRESSES
Filed May 2, 1929  2 Sheets-Sheet 2
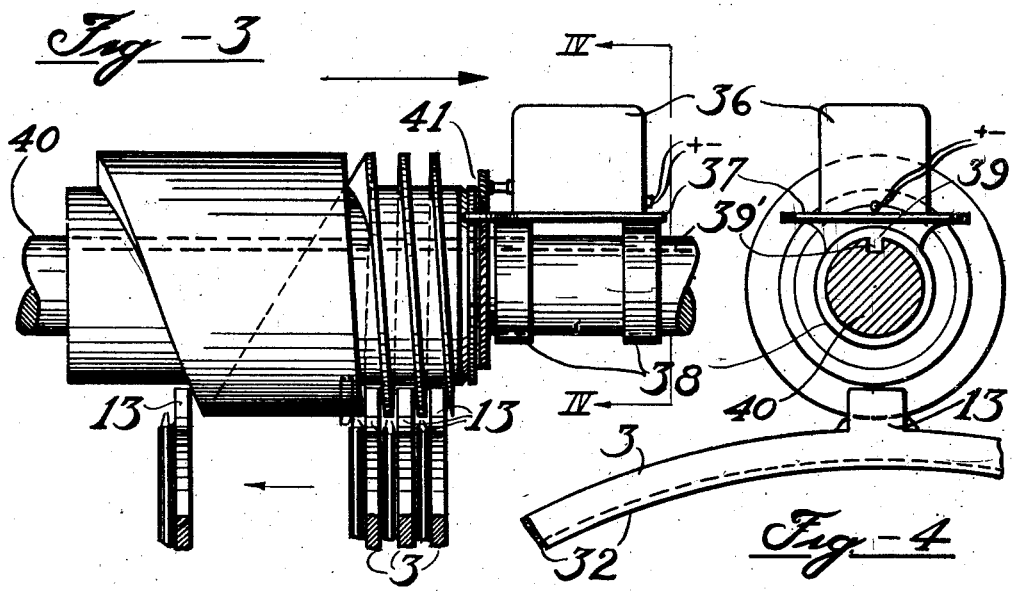
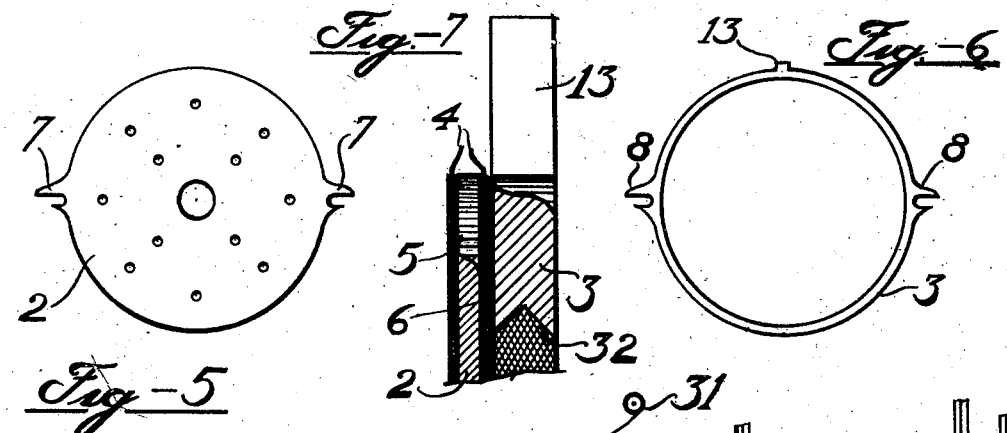
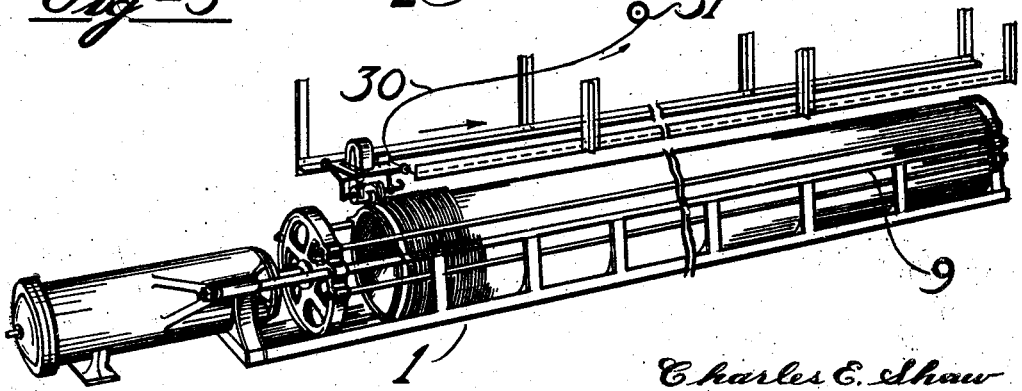
Charles E. Shaw
INVENTOR
BY
ATTORNEY Patented June 24, 1930

1,767,318

UNITED STATES PATENT OFFICE

CHARLES E. SHAW, OF CRANFORD, NEW JERSEY

METHOD AND APPARATUS FOR OPERATION OF FILTER PRESSES

Application filed May 2, 1929. Serial No. 359,748.

This invention relates to improvements in methods and apparatus for operating filter presses, and particularly to the separation of the charged filter plates at the close of the operation. A principal object of the invention is to provide mechanical means to accomplish the laborious breaking apart of plates in presses for filtration of paraffin wax from hydrocarbon oils, but my improvements are not limited to use on such presses. A further object of the invention is to provide automatically operating means for removing or assisting in removing the material deposited on the plates.

The invention will be fully understood from the following description, read in connection with the accompanying drawing, in which Fig. 1 is a fragmentary side elevation, partly in section, showing the plate-separating means and a fluid-injection device for removing deposits;

Fig. 2 is an end view of the equipment shown in Fig. 1, looking in the direction of the arrow A;

Fig. 3 is a fragmentary side elevation of an alternative form of plate-separating means;

Fig. 4 is a transverse section on the line IV—IV of Fig. 3;

Fig. 5 is a side elevation of a filter press plate;

Fig. 6 is a similar view of a filter press ring;

Fig. 7 is a fragmentary transverse section through a press plate and ring;

Fig. 8 is a perspective view showing an assembled press and the improved opening means.

Referring first to Figs. 1, 2, and 5 to 8, reference numeral 1 denotes generally a filter press of the usual hydraulic type having solid center plates 2 and spacing rings 3. The center plates are covered with canvas 4 and are placed between perforated discs 5 and 6 (Fig. 7). Lugs 7 and 8 on plates 2 and rings 3, respectively, are engaged with the side rods 9 of the press, all in the customary manner. This type of press is referred to only for illustration, and my invention is not to be limited thereto.

The preferred form of my operating mechanism is shown in Figs. 1 and 2, and comprises a cylindrical billet 10, preferably of steel, having a right-hand worm 11 formed upon its surface or secured thereto. The billet is mounted for rotation as subsequently described. The first turns 12 of the worm are of the same pitch and thread width. These turns run freely between lugs 13 formed on rings 3. The last turn of the worm is gradually increased in width to form an actuating surface or cam thread 14 which enters between adjacent lugs 13, and forces the rings carrying them apart, as shown in Fig. 1, at the left, where a unit consisting of a canvas-covered plate 2 and ring 3 is shown separated from the main body of plates.

When it is desired to effect also a separation between the plate and the ring, I provide a lug 15 on each center plate 2. These lugs are smaller than lugs 13 and are alined with them. The billet 10 carries an abutment 16, preferably of the contour shown, which is adapted to engage the lug 13 on the opposite side from that which has been engaged by the cam thread 14. Continued rotation of the billet in the right-hand direction causes the abutment 16 to engage the lug 13 and partially reverses the movement of the ring carrying that lug.

In order to prevent a filter plate from following the accompanying ring, due to adhesion of the wax or other material it carries, suitable holding means are provided. This is preferably a guide 17 in the form of a quadrant made integral with or secured to the abutment 16 and concentric with billet 10. The guide 17 has its forward end beveled as at 17ᵃ, Fig. 2. This end enters between lugs 13 and 15, as the billet rotates.

Accordingly the ring 3, carrying lug 13, follows the reverse curve of abutment 16, while plate 2 is prevented from moving rearwardly by engagement of its lug 15 with guide 17. In some cases lugs 15 may be omitted for it has been found that in plates having the canvas covers extending upwardly a substantial distance, there is sufficient friction between the canvas and guide 17 to separate the plate and ring.

It will be understood that other suitable holding devices may be used, for example a ratchet or similar device adapted to permit the passage of lug 15 in the forward but not in the reverse direction.

I prefer to provide also a follower 18 of arcuate form on the worm thread just preceding the cam thread 14. The follower 18 has a beveled end 18$^a$ which is adapted to enter between the rear side of a lug 13 and the canvas cover of the filter plate abutting against that side. This is advantageous in cases where the adhesion between the ring and following plate may be sufficient to make them move as a unit.

The separating mechanism is mounted on a carriage 19, which carries the source of power. This is preferably an electric motor 20, pneumatic turbine, or the like, connected through a gear reduction 21 with a chain 22 which actuates the billet 10 carrying the worm. The carriage 19 is mounted on wheels 23 which run on angle irons 24, extending longitudinally of the press. A second set of wheels 25 may be mounted on arms 26 to run on the under side of the angle irons to prevent the carriage from upward movement. The shaft 27 on which the billet rotates is supported by arms 27' extending downwardly from the carriage 19 and having bearing members 28 at their lower ends. These arms are braced by struts 29.

The feed wires or hose 30 running to the motor or pneumatic turbine are preferably mounted on a spring windlass 31, or a similar device, which will pay out and take in the wire in accordance with the position of the motor or turbine over the press (Fig. 8).

The removal of the wax from the filter plates 2 may be facilitated by notching the inner periphery of the rings 3 as at 32 (Fig. 7); or any other suitable wax-engaging indentation, projection, or the like may be provided.

A further provision for assisting in the cleaning of the press is illustrated in Figs. 1 and 2. The shaft 27 has a perforation 33 extending longitudinally to a point beneath the cam thread 14 where it is deflected and opens at the side of the shaft. The billet also has a perforation 34 adapted to coincide with the perforation 33 at one point. When the billet is rotated one half turn from the position shown in Fig. 1, the perforations coincide. In this position the deposit on the plates is exposed by separation of the ring and plate through the action of guide 17.

Air or other fluid under pressure is injected through a line 35 into the perforation 33. When the two perforations coincide, this pressure fluid discharges forcibly against the plate 2 in a manner to loosen and dislodge the deposit from it. Steam or other heated fluid may be used if warming of the press is not objectionable. The extent of the discharge opening may be determined in view of the time of fluid pressure application needed. When the deposits are very tenacious it will be necessary to clean the plates manually, at least to some extent.

In the device shown in Figs. 3 and 4, the construction of the worm is similar to that already described, but a different driving mechanism is used. This comprises a motor 36 mounted on a platform 37 which is secured to circular supports 38. These carry a tenon 39 adapted to slide in a keyway 39' formed in a shaft 40 which carries the rotating worm. The latter is run by a gear-connection 41 actuated by the motor. The shaft is suitably supported over the press by means not shown.

In operating all forms of the equipment described above, the pressure on the press is relieved at the end of the operation, the carriage 19 is then run to the end of the press, and the motor is started. The carriage is moved forward by the engagement of the worm with lugs 13 on filter rings 3. As the enlarged cam thread 14 engages adjacent lugs it forces the plates apart as described. Ordinarily a single engaging means is sufficient, but it is within the scope of the invention to provide two or more actuating worms or the like to engage alined lugs on different portions of the plates.

If the automatic cleaning device is to be used, air under pressure is supplied through line 35. In this way the deposit on the plates is automatically removed as the plates are opened. In the case of very tenacious deposits, as noted, manual scraping may be required also. With this installation two workmen can clean a large paraffin wax press efficiently in a short time. The workmen will follow the machine and remove any wax that may not be dislodged by the air jet. Ordinarily, if the workmen are not able to maintain the speed of the motor, it will be preferred to break apart or separate not more than 20 or 25 plates in a single operation. When this number of plates has been separated, the machine is started afresh on the next group of plates and so on throughout the length of the press. The stopping and starting of the motor may be done automatically by any of the well-known stop switch devices.

The foregoing description is merely illustrative, and various changes and alternative arrangements may be made within the scope of the appended claims in which it is my intention to claim all novelty inherent in the invention as broadly as the prior art permits.

I claim:

1. In plate-separating means for a press, the improvement which comprises a separating member, means for operatively supporting the member with respect to the plates of the press, and means for progressively inserting the member, thereby exciting lateral pressure to separate adjacent plates.

2. Apparatus according to claim 1, in which the separating member is a cam surface mounted on a rotating body.

3. In a filter press, means adapted to separate the press plates, said means comprising a cam surface adapted to travel along the press and exerting lateral pressure to separate adjacent plates, and a device for actuating the cam surface.

4. In a filter press, means for separating the press plates, said means comprising a rotatable worm having an expanded cam thread adapted to separate adjacent filter plates, means for rotating the worm, and means for causing the same to travel along the press.

5. In combination with a filter press, means for separating the press plates, comprising a carriage mounted for movement along the press, a movable cam surface carried by the carriage, means adapted to be engaged by the cam surface to exert lateral pressure to separate the plates, and means for actuating the cam surface.

6. In combination with a filter press, means for separating the press plates, comprising a carriage mounted for movement along the press, a rotatable billet, a worm carried thereby and having an expanded thread adapted to separate adjacent plates, and means for rotating the billet.

7. In combination with a filter press having a series of parallel plates and associated rings with substantially alined lugs extending therefrom, means for separating the plates, comprising a rotatable worm having its forward turns adapted to rotate freely between the lugs and its rear turns of greater width than the space between adjacent lugs, and means for rotating the worm.

8. Apparatus according to claim 7, in which the worm is mounted on a carriage adapted to move along the press, and the tractive effect of the worm advances the carriage.

9. In combination with a filter press having a series of parallel plates with spacing rings between adjacent plates, alined lugs on the rings, a separating member, means for progressively inserting the member between lugs on adjacent rings to separate the same, and means coacting with the member to separate the rings from the plates.

10. Apparatus according to claim 9, in which alined lugs are provided on the plates also and means are provided to engage the plate lugs and prevent the plates following the rings.

11. In combination with a filter press having a series of parallel plates with spacing rings between adjacent plates, alined lugs on the plates, alined lugs on the rings, a carriage mounted to run along the press, a rotatable worm carried by the carriage and having a cam thread adapted to work between lugs on adjacent rings and separate the same, each separated ring being accompanied by a plate, an abutment at the rear of the worm so arranged as to reverse partially the motion of the rings, and means carried by the billet and adapted to engage the lugs on the separated plates, whereby they are prevented from following the reverse motion of the rings.

12. Apparatus according to claim 11, in which means are provided on the rings for engaging the deposit on the plates to assist in dislodging the deposit when the ring and plate are separated.

13. Apparatus according to claim 11, in which a fluid is injected between the rings and plates at the moment of separation to assist in dislodging the deposit.

14. Apparatus for cleaning filter presses, comprising a rotatable member having means thereon for separating adjacent plates, means for rotating the member, and a fluid jet placed in operation by said rotation so as to discharge upon the plates.

15. Apparatus for cleaning filter presses, comprising a rotatable member having a cam surface adapted to enter between adjacent plates and separate the same, a shaft on which said member rotates, a perforation in the shaft, a perforation in the member, means for operating the member to separate the plates and thereupon cause said perforations to coincide, and means for passing a fluid under pressure through the perforations to discharge against the deposit on the separated plates.

16. Method of automatically separating the plates of a filter press, comprising progressively advancing a separating member along the press, operatively engaging the member to exert lateral pressure with respect to adjacent plates, and actuating the member to separate the plates.

17. Method of automatically separating the plates of a filter press, having plates spaced by rings, comprising advancing a separating member along the press by a worm drive between said member and the press rings, and causing an expanded thread at the rear of the worm to separate the rings each with its associated plate.

18. Method of cleaning filter presses such as those used in the separation of paraffin wax from petroleum oil, comprising automatically separating the plates of the press by progressively exerting lateral pressure against each plate, and dislodging the wax therefrom, at least in part, by injection of a fluid under pressure.

19. Method of cleaning filter presses, comprising automatically separating the plates of the press by progressively exerting lateral pressure against each plate and discharging a blast of fluid against the material on the separated plates, said discharge being automatically synchronized with the separation of the plates.

CHARLES E. SHAW.